United States Patent [19]

Begun et al.

[11] Patent Number: 5,125,084
[45] Date of Patent: Jun. 23, 1992

[54] CONTROL OF PIPELINED OPERATION IN A MICROCOMPUTER SYSTEM EMPLOYING DYNAMIC BUS SIZING WITH 80386 PROCESSOR AND 82385 CACHE CONTROLLER

[75] Inventors: Ralph M. Begun, Boca Raton; Patrick M. Bland; Mark E. Dean, both of Delray Beach, all of Fla.

[73] Assignee: IBM Corporation, Armonk, N.Y.

[21] Appl. No.: 198,894

[22] Filed: May 26, 1988

[51] Int. Cl.⁵ .................................................. G06F 9/38
[52] U.S. Cl. ............................. 395/375; 364/DIG. 1; 364/231.8; 364/263.1; 364/243.41
[58] Field of Search ................................ 364/200, 900

[56] References Cited

U.S. PATENT DOCUMENTS

| | | | |
|---|---|---|---|
| 4,016,541 | 4/1977 | Delagi et al. | 364/200 |
| 4,257,095 | 3/1981 | Nadir | 364/200 |
| 4,314,334 | 2/1982 | Daughton et al. | 364/200 |
| 4,315,308 | 2/1982 | Jackson | 364/200 |
| 4,480,307 | 10/1984 | Budde et al. | 364/200 |
| 4,503,534 | 3/1985 | Budde et al. | 364/200 |
| 4,649,476 | 3/1987 | Sibigtroth | 364/200 |
| 4,853,846 | 8/1989 | Johnson et al. | 364/200 |
| 4,933,845 | 6/1990 | Hayes | 364/200 |

OTHER PUBLICATIONS

Burn's et al., within the 68020, Jan. 1987, pp. 103-106.
Intel, Introduction to the 80386, Sep. 1985, pp. 5-1 to 5-8.
Gandhi, Cache-Controller auf einem chip, Elektronik, Jan. 22, 1988, pp. 54, 55, 58, 60.
Dean et al., "16-Bit Data Transfer Using 8-Bit Direct-Memory Access Controller", IBM TDB, vol. 27, No. 3, Aug. 1984, pp. 1699-1700.
Intel Corporation, "Introduction to the 80386 Including the 80386 Data Sheet", Apr. 1986.
Intel Corporation, "82385 High Performance 32-Bit Cache Controller", Jul. 1987.
Intel Corporation, "80386 Hardware Reference Manual"-Chapter 7, Cache Subsystems, 1986.

*Primary Examiner*—Gareth D. Shaw
*Assistant Examiner*—Maria N. Von Buhr
*Attorney, Agent, or Firm*—John C. Black

[57] ABSTRACT

Any incompatibility between pipelined operations (such as is available in the 80386) and dynamic bus sizing (allowing the processor to operate with devices of 8-, 16- and 32-bit sizes) is accommodated by use of an address decoder and ensuring that device addresses for cacheable devices are in a first predetermined range and any device addresses for non-cacheable devices are not in that predetermined range. Since by definition cacheable devices are 32-bit devices, pipelined operation is allowed only if the address decoder indicates the access is to a cacheable device. In that event, a next address signal is provided to the 80386. This allows the 80386 to proceed to a following cycle prior to completion of the previous cycle. For accesses which are to devices whose address indicate they are non-cacheable, a next address signal is withheld until the cycle is completed, i.e. without pipelining. The invention further provides for proper interface between a DMA mechanism (driven by a first clock) and a CPU local bus subsystem (driven by an entirely different clock). Data provided by the DMA mechanism is latched into an interface between the CPU local bus and the system bus, and a DMA cycle completed. Only after completion of the DMA cycle is detected, is the cycle on the CPU local bus allowed to complete. In this fashion, the CPU can go on to a following operation and be assured that the DMA mechanism is no longer driving the system bus.

9 Claims, 7 Drawing Sheets

CONTROL OF PIPELINED OPERATION IN A MICROCOMPUTER SYSTEM EMPLOYING DYNAMIC BUS SIZING WITH 80386 PROCESSOR AND 82385 CACHE CONTROLLER

TECHNICAL FIELD

The present invention relates to improvements in microcomputer systems, particularly microcomputer systems which employ dynamic bus sizing and pipelined operations, and more particularly in such systems which further include a cache subsystem.

BACKGROUND ART

Background information respecting the 80386, its characteristics and its use in microcomputer systems including cache memory subsystems are described in Intel's "Introduction to the 80386", April 1986 and the 80386 Hardware Reference Manual (1986). The characteristics and operating performance of the 82385 are described in the Intel publication "82385 High Performance 32-Bit Cache Controller" (1987).

In microcomputer systems, as in other computer systems, speed of operations is an important criterion which in most cases has to be balanced against system cost. Many features which were first introduced to speed up operations in mainframe computers and minicomputers are now finding their way into microcomputer systems. These include cache memory subsystems and pipelined operations.

In some microcomputer systems (for example those employing the Intel 80386), pipelined operations are an attractive operating option. For 80386/82385 microcomputer systems the 82385 cache controller provides an NA signal which it is suggested should be connected to a corresponding input on the 80386. This allows the 82385 to assert the NA signal to the 80386 prior to completion of a given bus cycle to enable the 80386 to output information (data, address and/or control) for the next operating cycle. The timing is arranged, along with connected components, so that if a cache operation is the given operation, information for the given operation has already been accepted by the cache memory and therefore changing the 80386 output information to correspond to the next cycle will not interfere with the operation which is in the process of being completed. This also holds true for situations in which a cache miss condition has occurred requiring reference not to the cache memory but to main memory since access to main memory is via latched buffers which therefore store information respecting the given operation.

The 80386 also has the capability of operating with what is referred to as dynamic bus sizing. The 80386 is nominally a 32-bit machine, i.e. the width of the data bus is 32 bits. However, the 80386 can operate with 16-bit devices (devices which will transfer only 16 bits of data) by responding to a BS16 signal which is provided to the 80386 to indicate the presence of a 16-bit device. The BS16 signal is important to the 80386 in the event that it has performed a 32-bit operation. Of course the 16-bit device cannot, in one operation, transfer the 32 bits of data which the 80386 is capable of generating and/or accepting. Thus, a second operation (cycle) is necessary and the 80386 responds to the BS16 signal to automatically generate the next, necessary, cycle.

In order for this type of operation to be successful when the 82385 is present it is also necessary for the 82385 to have information respecting the character of the device taking part in the operation so that the NA signal to the 80386 is not improvidently generated. As described in the referenced Intel publications the 82385 requires device information at the beginning of a cycle in contrast to the 80386 which can accept and act on device information substantially later in the cycle.

In some microcomputer systems, this constraint is accepted by correlating the address of a device with its size so that for example all 32-bit devices are in a first predetermined address range and all 16-bit devices are in a second, different address range. By this technique then, the size of a device can be determined by its address.

However, in systems which require the flexibility of locating a wide variety of devices within widely varying address ranges, this constraint cannot be complied with. One class of such systems are those employing the IBM Micro-Channel (TM) bus.

In many systems, including systems of the foregoing type, a device when addressed will return an indication of its size. However, since the 82385 requires device size information to be available at the beginning of a bus cycle, in systems where this information is only available later in the cycle, there is the possibility of an improvident NA signal.

Therefore it is an object of the present invention to provide an arrangement in an 80386/82385 microcomputer system which selectively controls the NA signal so that it is coupled to the 80386 only under appropriate circumstances. In other circumstances the NA signal is prevented from reaching the 80386. Preventing the NA signal from reaching the 80386 prevents pipelined operation, i.e. it prevents the generation of information for a next cycle before the given cycle has been completed. With this flexible control of the NA signal, the microcomputer system can now operate with dynamic bus sizing, i.e. it can now operate with devices of various sizes without information at the beginning of the cycle as to the size of the device being operated with.

Cacheable devices, i.e. devices generating data which can be cached, are necessarily 32-bit devices. All such devices have addresses (specifically, tags) indicating cacheability. All other devices (whether or not 32-bit devices) have addresses indicating information they generate will not be found in cache. Control of the NA signal depends in part on cacheability. Specifically, since any cacheable device is a 32-bit device, there is no question of improvident NA signals when operating with cacheable devices. Furthermore, in the event of a cache hit, there is no question but that the NA signal is appropriate since only cacheable devices (32-bit devices) will produce a cache hit. Thus an important feature of allowing dynamic bus sizing and pipelined operations is preventing or inhibiting the NA signal from reaching the 80386 in the event of assertion of an address to a non-cacheable device.

If, during the course of a given cycle (where the NA signal has been inhibited), it turns out the device is a 32-bit device, then the cycle completes in normal fashion (without pipelining). On the other hand, if it turns out during the course of the cycle that the device being operated with is a 16-bit device (and the cycle is a 32-bit cycle), then the 80386 generates the additional, necessary cycle. This operation is entirely transparent to the 82385, i.e. the 82385 takes no part in controlling the second of the two cycles. Finally, if the device being operated with turns out to be an 8-bit device, then the 80386 "sees" a 16-bit device so that it operates exactly as has been described for the case when the device is a 16-bit device. In other words, the 80386 "sees" a 16-bit device so that after the first cycle is completed (during which cycle it is informed that it is operating with a 16-bit device), a second cycle is generated. However, not only transparent to the 82385, but also transparent to the 80386, other logic converts each of the 16-bit cycles of the 80386 into two 8-bit cycles. Thus in the case where a 32-bit cycle is directed at an 8-bit device, the 82385 takes no part in the operation, the 80386 generates two 16-bit cycles, and other logic operates on each of the 80386 16-bit cycles to generate two 8-bit cycles.

Thus in accordance with one aspect, the invention provides a microcomputer system with pipelined instruction sequencing responsive to a next address signal prior to completion of a pending operation, said microcomputer system comprising:

a processor of a given bit width, a cache memory subsystem of said given bit width coupled to said processor by a local bus, a further bus connecting said local bus with other components having said given bit width and with at least one component of a reduced bit width, at least some of said components having said given bit width having an address in an address range associated with said cache subsystem and said at least one component of reduced bit width having an address outside an address range associated with said cache subsystem, wherein said microcomputer system further includes:

a) address decoder means responsive to an asserted address on said local bus for generating a signal indicating whether said asserted address is or is not within said address range associated with said cache memory subsystem, and b) logic means responsive to said signal from said address decoder means for generating a next address signal to said microprocessor for pipelined operation unless said address decoder means indicates an asserted address outside a range associated with said cache subsystem.

DETAILED DESCRIPTION OF A PREFERRED EMBODIMENT

Figure 1:
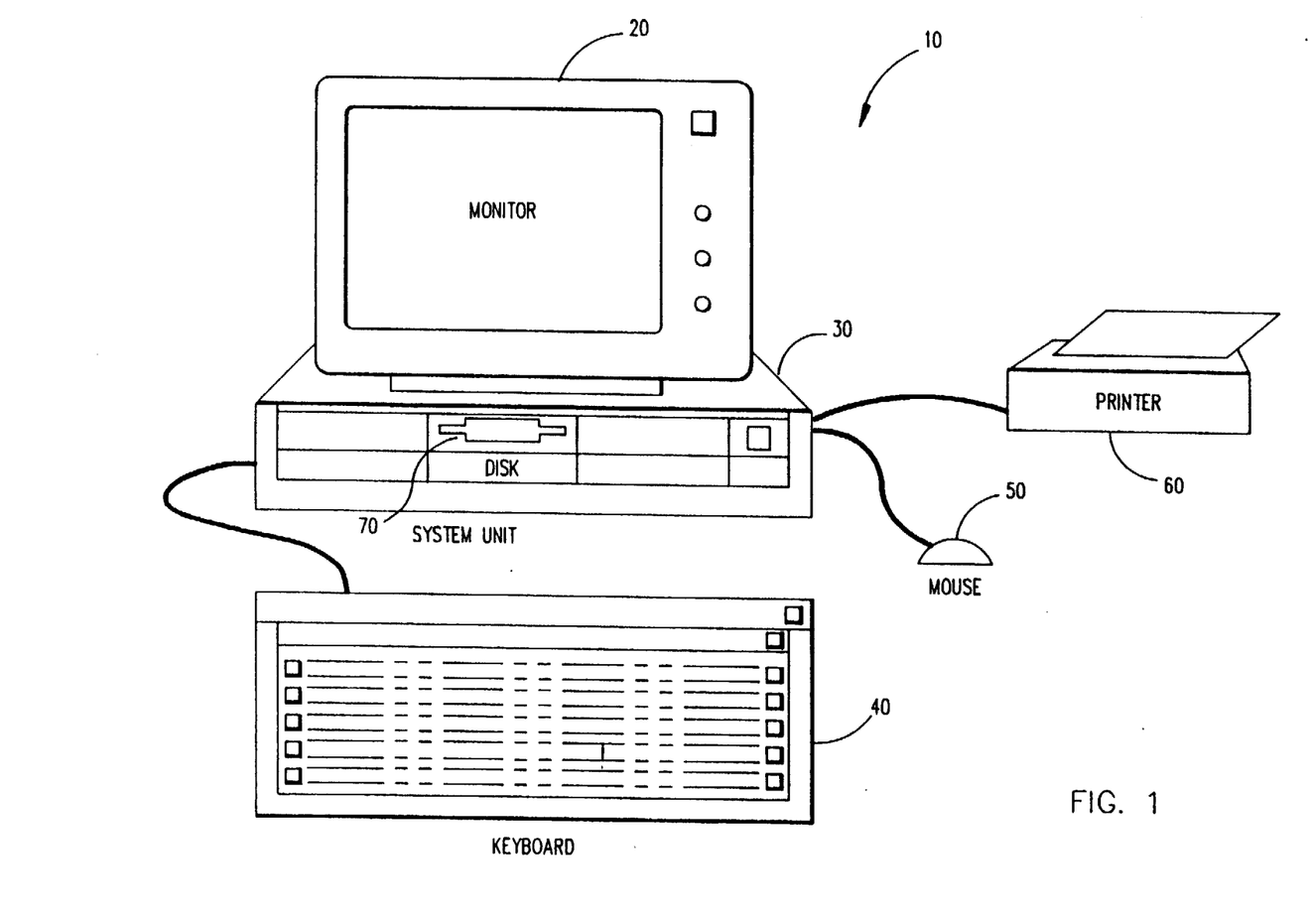
FIG. 1 is an overall three-dimensional view of a typical microcomputer system employing the present invention.

FIG. 1 shows a typical microcomputer system in which the present invention can be employed. As shown, the microcomputer system 10 comprises a number of components which are interconnected together. More particularly, a system unit 30 is coupled to and drives a monitor 20 (such as a conventional video display). The system unit 30 is also coupled to input devices such as a keyboard 40 and a mouse 50. An output device such as a printer 60 can also be connected to the system unit 30. Finally, the system unit 30 may include one or more disk drives, such as the disk drive 70. As will be described below, the system unit 30 responds to input devices such as the keyboard 40 and the mouse 50, and input/output devices such as the disk drive 70 for providing signals to drive output devices such as the monitor 20 and the printer 60. Of course, those skilled in the art are aware that other and conventional components can also be connected to the system unit 30 for interaction therewith. In accordance with the present invention, the microcomputer system 10 includes (as will be more particularly described below) a cache memory subsystem such that there is a CPU local bus interconnecting a processor, a cache control and a cache memory which itself is coupled via a buffer to a system bus. The system bus is interconnected to and interacts with the I/0 devices such as the keyboard 40, mouse 50, disk drive 70, monitor 20 and printer 60. Furthermore, in accordance with the present invention, the system unit 30 may also include a third bus comprising a Micro Channel (TM) architecture for interconnection between the system bus and other input/output devices.

Figure 2:
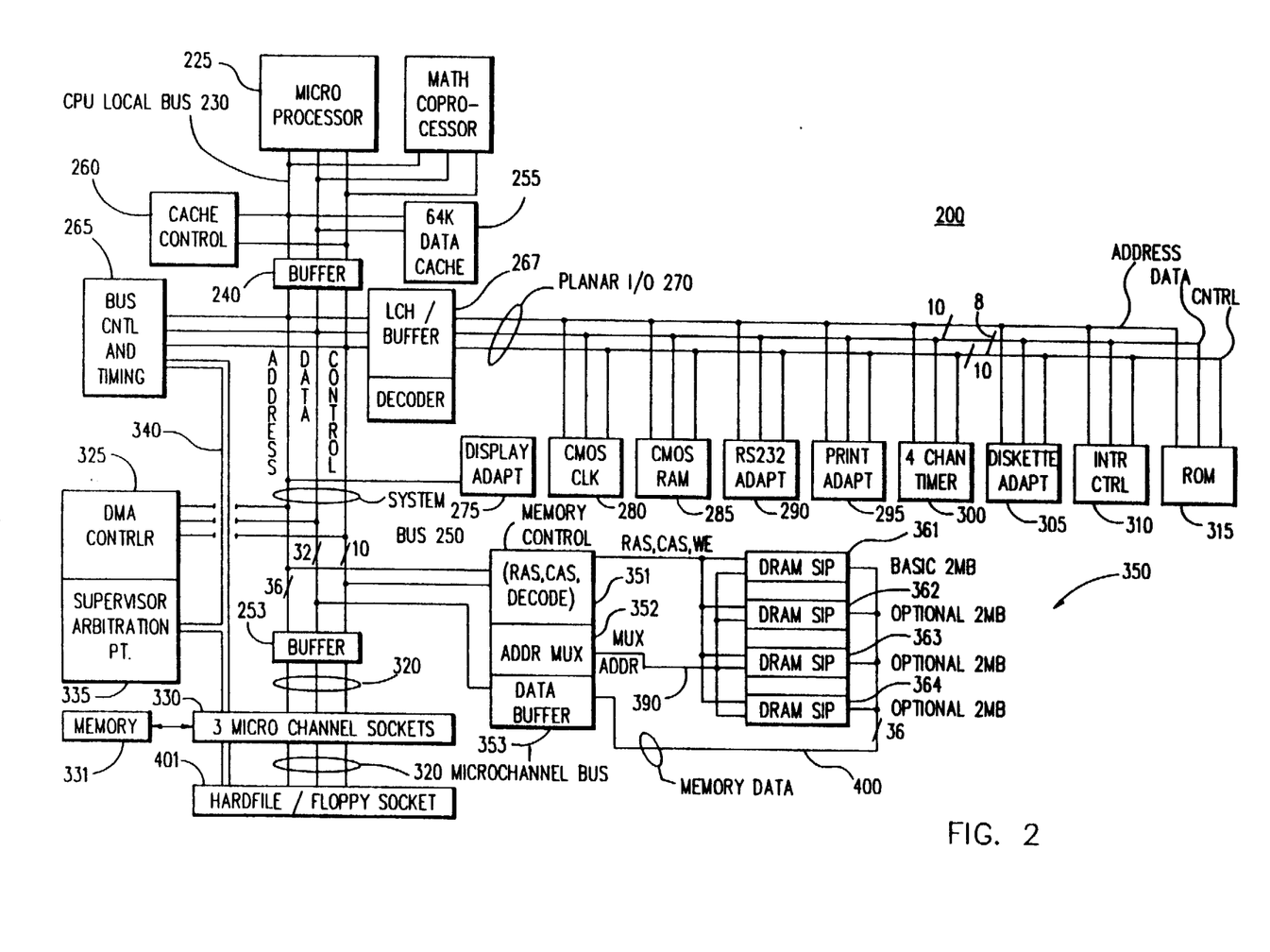
FIG. 2 is a detailed block diagram of a majority of the components of a typical microcomputer system employing the present invention.

FIG. 2 is a high level block diagram illustrating the various components of a typical microcomputer system in accordance with the present invention. A CPU local bus 230 (comprising data, address and control components) provides for the connection of a microprocessor 225 (such as an 80386), a cache control 260 (which may include an 82385 cache controller) and a random access cache memory 255. Also coupled on the CPU local bus 230 is a buffer 240. The buffer 240 is itself connected to the system bus 250, also comprising address, data and control components. The system bus 250 extends between the buffer 240 and a further buffer 253.

The system bus 250 is also connected to a bus control and timing element 265 and a DMA controller 325. An arbitration control bus 340 couples the bus control and timing element 265 and a central arbitration element 335. The main memory 350 is also connected to the system bus 250. The main memory includes a memory control element 351, an address multiplexer 352 and a data buffer 353. These elements are interconnected with memory elements 361 through 364, as shown in FIG. 2. Address lines 390 couple the address multiplexer 352 to the memory elements 361-364. Memory data lines 400 couple the data buffer 353 to the memory elements 361-364 inclusive.

A further buffer 267 is coupled between the system bus 250 and a planar bus 270 of I/O subsystem 200. The planar bus 270 includes address, data and control components, respectively. Coupled along the planar bus 270 are a variety of I/O adapters and other components such as the display adapter 275 (which is used to drive the monitor 20), a clock 280, additional random access memory 285, an RS 232 adapter 290 (used for serial I/O operations), a printer adapter 295 (which can be used to drive the printer 60), a timer 300, a diskette adapter 305 (which cooperates with the disk drive 70), an interrupt controller 310 and read only memory 315.

The buffer 253 (coupled on one side to the system bus 250) is coupled on the other side to the Micro-Channel (TM) sockets 401 and 330 of the Micro-Channel (TM) bus 320. Bus 320 can support devices of various size including 32-bit devices, 16-bit devices and 8-bit devices. A typical memory device 331 is shown coupled on the bus 320. One of the advantages of this bus is the flexibility the user is provided with to freely insert various devices in the different sockets, at will. The mixing of these devices and their appearance at different sockets prevents rigid addressing allocation and is a prime reason for the necessity of the present invention. Absent the present invention, the 80386/82385 microcomputer system as described herein would be either wholly prevented from using pipelining operations or alternatively subjected to faulty operation caused by improvident or inappropriate pipelining operations.

Figure 3:
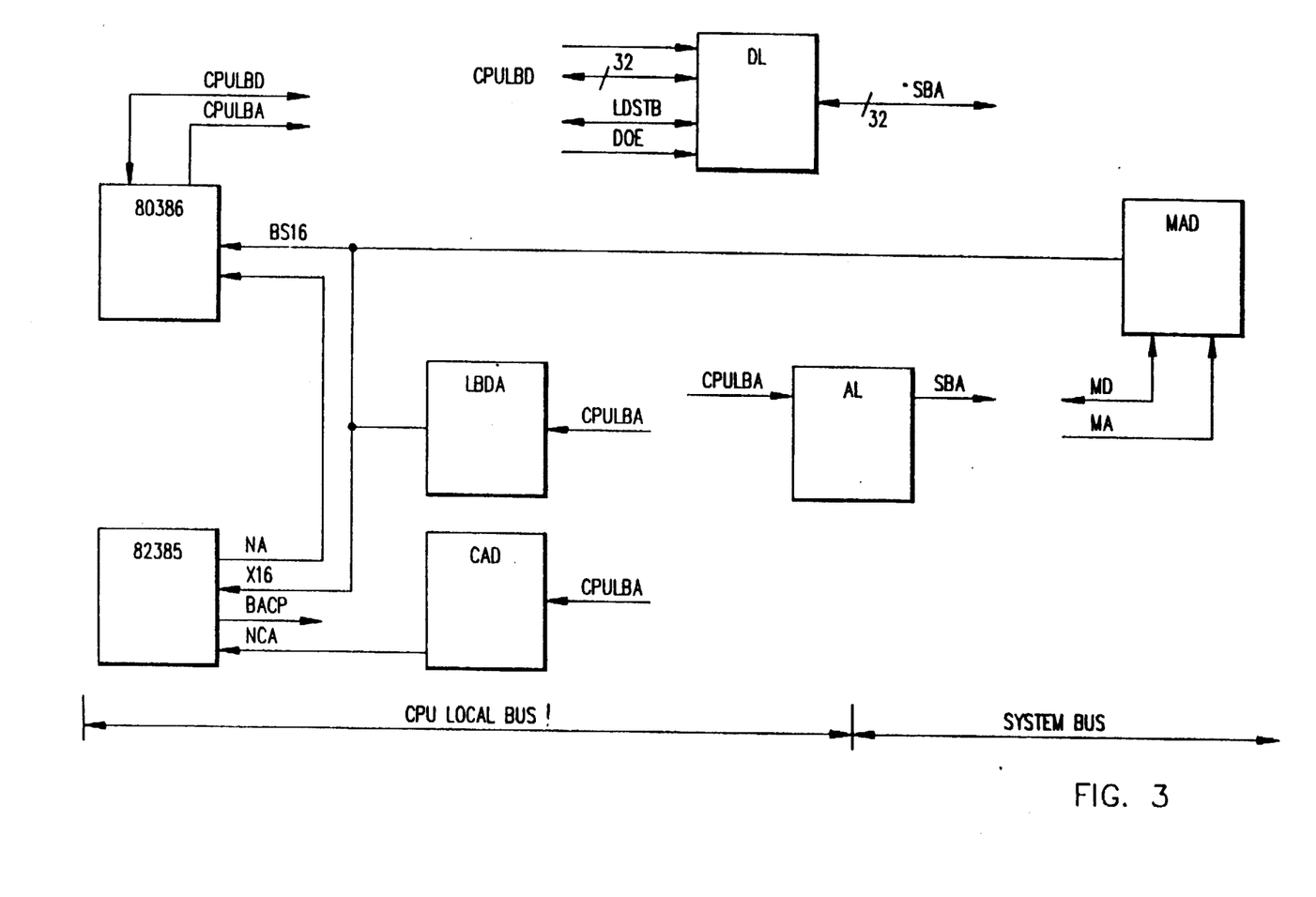
FIG. 3 is a block diagram, in somewhat more detail than FIG. 2, showing those connections between the 80386 and 82385 recommended by the manufacturer and which is useful to an understanding of why such an arrangement is inconsistent with dynamic bus sizing.

FIG. 3 shows selected interconnections between the 80386 and 82385, relative to generation and use of the Next Address (NA) signal, as recommended by the manufacturer. More particularly, the interface between the CPU local bus 230 and the system bus 250 is the buffer 240 whose components include a control buffer DL (for data) and AL (for address). As shown in FIG. 3, the data component of the CPU local bus (CPULBD) is one input/output connection for the DL, on the CPU local bus side. Likewise, the data component SBD of the system local bus 250 is the input/output connection to the DL, on the side of the system bus 250. The buffer DL is controlled by its input signals LDSTB, BT/R and DOE. LDSTB latches data into DL and DOE enables the output of DL. The direction from which input is accepted (CPU local bus 230 or system bus 250) and to which output is directed (system bus 250 or CPU local bus 230) is determined by BT/R.

Likewise, the address component of the buffer AL has an input from the address component of the CPU local bus (CPULBA) and an output to the address component of the system local bus 250 (SBA). In a similar fashion, the AL component of the buffer is controlled by its two control signals BACP and BAOE, the former latches address information from CPULBA into AL and the latter enables the output, i.e. to the system bus 250. The control signals LDSTB, DOE, BACP and BAOE are provided for by the 82385.

The address component CPULBA of the CPU local bus 230 originates at the 80386 and the data component CPULBD of the CPU local bus 230 originates/terminates at the 80386.

The 82385 uses two additional signals X16 and NCA in the generation of the NA signal. The X16 signal indicates whether the device which is being operated with is a 16-bit or 32-bit device. One source of the signal X16 is the Local Bus Address Decoder (LBAD). In addition, the manufacturer recommends that the signal BS16 be tied to the signal X16. The signal BS16 is input to the 80386 to indicate to the 80386 whether the device being operated with is 16 or 32 bits in size. A source of the signal BS16 is a device address decoder, such as MAD. MAD represents the address decoder of any device coupled to the system bus 250 or any other bus coupled thereto such as the bus 270 or 320. When a device such as MAD recognizes its address on a bus address component such as MA, it returns the signal BS16, which is high or low depending on whether the device is a 16- or 32-bit device.

The Non-Cacheable Address (NCA) is another input to the 82385 which indicates whether an address asserted is a cacheable address. A cacheable address is defined as an address for a device which is compatible with the cache subsystem and hence is a 32-bit device. This signal is generated by the Cache Address Decoder (CAD) by virtue of an input from the address component of the CPU local bus 230. The manufacturer suggests that a portion of memory can be set aside as non-cacheable by use of this input to the 82385.

The recommended architecture illustrated in FIG. 3 provides for effective pipelined operations (by use of the NA signal) under any one of the following circumstances:

1) where all devices connected to the system bus 250 or any bus coupled thereto are 32-bit devices, or
2) where the devices connected to the system bus 250 or any bus coupled thereto may be 32-bit or 16-bit devices, so long as the signal X16 is available at the beginning of any bus cycle.

When the X16 signal is available at the beginning of a given bus cycle, the 82385 based on that information determines whether the NA signal is appropriate, and if it is not appropriate, it is not generated. Thus in the event the 80386 is operating with a 32-bit device, then the NA signal is normally generated prior to completion of a given cycle for effecting pipelined operation. On the other hand, if the device is a 16-bit device, then the NA signal is not generated, allowing the 80386 to generate the second necessary cycle for proper operation with a 16-bit device.

However, the architecture of some bus subsystems (for example the Micro-Channel (TM) bus) provides for the mixing of 8-bit and 16-bit and 32-bit devices. Because the signal BS16 is not returned until sometime after the typical device MAD has recognized its address on the bus subsystem, it is not generated early enough for the 82385 to take into account in determining whether to generate NA. Accordingly, the peculiarities of the 82385 make it incompatible, particularly in the generation of the NA signal, with bus subsystems having the flexibility such as is exhibited by the Micro-Channel (TM) bus.

Figure 4:
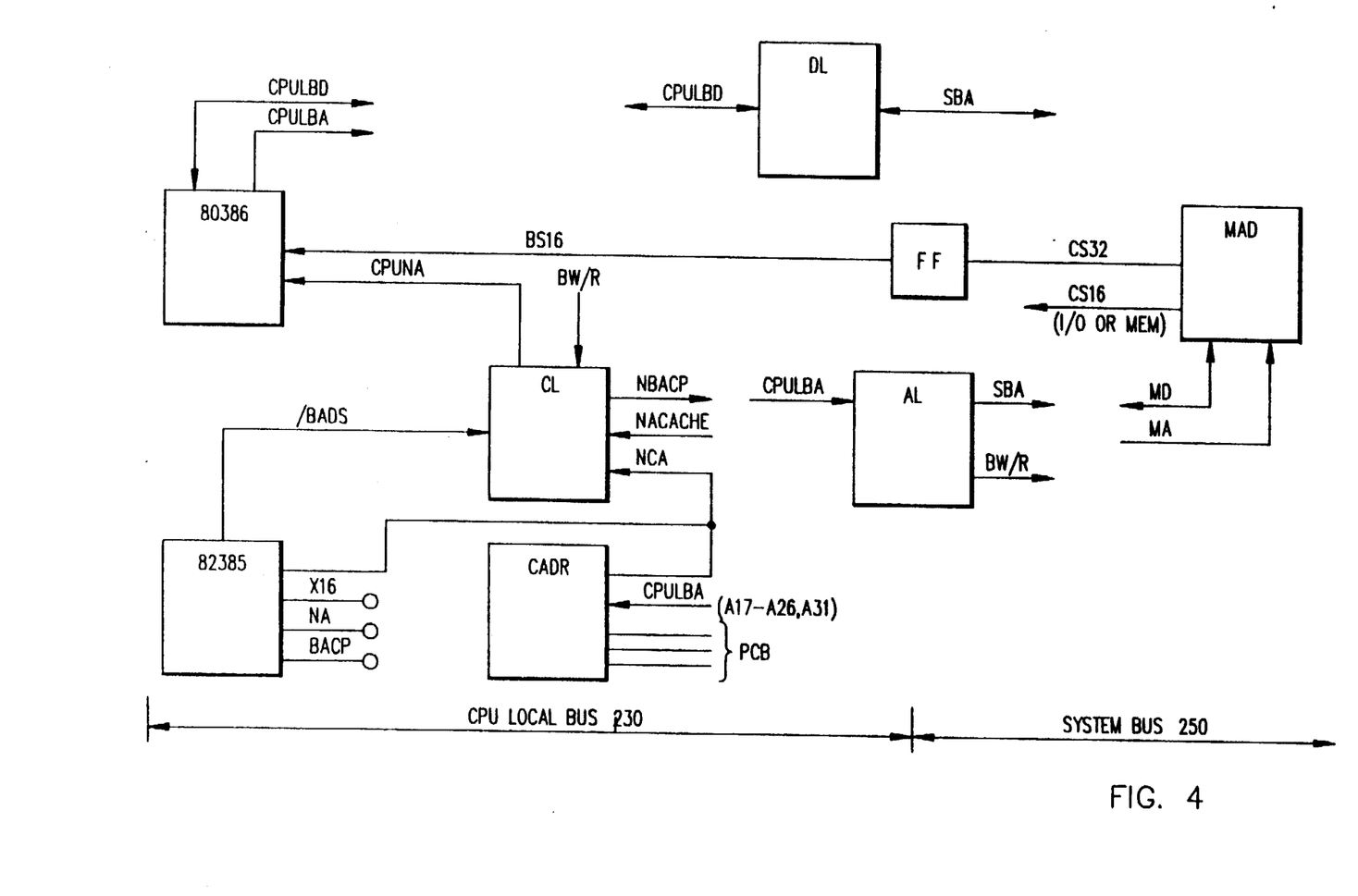
FIG. 4 is a more detailed block diagram similar to FIG. 3 but illustrating application of the present invention which allows both pipelined instruction sequencing and dynamic bus sizing.

FIG. 4 is a block diagram similar to FIG. 3 but altered for use in accordance with the present invention. Before describing the operation of the apparatus shown in FIG. 4, a number of the differences between FIGS. 3 and 4 will be described.

One major difference is that the outputs X16 and NA from the 82385 are no longer utilized. In addition, a new logic element CL is interposed between the 82385 and the 80386. The logic element CL generates the CPUNA signal (replacing the unused NA signal from the 82385). The logic unit CL is responsive to the NCA signal from the CADR and BADS signal from the 82385 (indicating whether there is a cache miss). The logic element CL also has an input BW/$\overline{R}$ indicating whether any system bus cycle is a read or a write. As will be described, while BW/$\overline{R}$ is used in an embodiment of the invention, it is a signal which is not essential.

The decoder CADR receives, in addition to its inputs from bits A17–A26 and A31 of the CPULBA, Programmable Cacheability Bits (PCB). In an embodiment actually constructed, the first of these three bits represents a decision to allow caching ROM space. A second bit either enables the decoder CADR to output NCA based on the decoded information, or alternatively, to declare all accesses non-cacheable, i.e. assert NCA regardless of the asserted address on the CPULBA. Finally, a third bit indicates, in one state, that address space between 0 and 8 megabytes is cacheable and that address space between 8 to 16 megabytes is non-cacheable. In the other state, the bit indicates that address space in the range 0 to 16 megabytes is all cacheable. If desired, the effect of this bit can be multiplied by simply reflecting the status of the first 16 megabytes through the succeeding 16 megabyte ranges. Of course, the use of these particular cacheability indicators (or others) is not essential to the invention. It is, however, important to arrange the CADR so that it can quickly decode its inputs and produce NCA. In an embodiment actually constructed, the timing window for production of NCA, from valid addresses on the CPULBA, was very short, on the order of ten nanoseconds.

A further major difference between FIGS. 3 and 4 is that the typical MAD now generates not a single BS16 signal (as is the case in FIG. 3), but two signals, CS32 and CS16. This enables the MAD to identify itself as a 32-bit device, a 16-bit device or an 8-bit device. The signal CS32 is input to a flip-flop FF which is now used to generate the BS16 signal which is in one condition in the event the MAD is a 32-device and in a different condition if the MAD is an 8-bit or a 16-bit device. If neither CS32 nor CS16 is generated by the device, then by default the device is an 8-bit device.

The logic equations related to the generation of CPUNA are reproduced immediately below. In this material the symbols have the following meanings associated with them:

| Symbol | Definition |
|---|---|
| / | Negation |
| := | A registered term, equal to |
| = | A combinatorial term, equal to |
| & | Logical AND |

| Symbol | Definition |
|---|---|
| + | Logical OR |

Logic Equations $$/BT2:= BUSCYC385 \ \& \ PIPECYC385 \ \& \ /BADS \ \& \ CLK \ \& \ BT2 \quad (1)$$
$$+ \ BUSCYC385 \ \& \ /PIPECYC385 \ \& \ BADS \ \& \ CLK \ \& \ NACACHE \ \& \ BT2$$
$$+ \ MISS1 \ \& \ /BUSCYC385 \ \& \ /BADS \ \& \ /(BW/R) \ \& \ CLK \ \& \ NCA \ \& \ /BREADY$$
$$+ \ /MISS1 \ \& \ /BREADY \ \& \ /BUSCYC385 \ \& \ CLK$$
$$+ \ /BT2 \ \& \ BREADY \ \& \ NACACHE$$
$$+ \ /CLK \ \& \ /BT2$$

$$/BUSCYC385:= BUSCYC385 \ \& \ /BADS \ \& \ CLK \quad (2)$$
$$+ \ BUSCYC385 \ \& \ /PIPECYC385 \ \& \ CLK$$
$$+ \ BUSCYC385 \ \& \ /BT2 \ \& \ CLK$$
$$+ \ /BUSCYC385 \ \& \ BREADY$$
$$+ \ /BUSCYC385 \ \& \ /CLK$$

$$/CPUNA:= /MISS1 \ \& \ CLK \ \& \ CPUNA \ \& \ /NACACHE \quad (3)$$
$$+ \ /MISS1 \ \& \ CLK \ \& \ CPUNA \ \& \ /BREADY \ \& \ /BUSCYC385$$
$$+ \ /CPUNA \ \& \ /CLK$$
$$+ \ /CPUNA \ \& \ CLK \ \& \ BREADY$$
$$+ \ /CPUNA \ \& \ BUSCYC385 \ \& \ NACACHE \ \& \ CLK$$

$$/MISS1:= MISS1 \ \& \ BUSCYC385 \ \& \ CPUNA \ \& \ /BADS \ \& \ /(BW/R) \ \& \ CLK \ \& \ NCA \quad (4)$$
$$+ \ MISS1 \ \& \ /BUSCYC385 \ \& \ /BADS \ \& \ /(BW/R) \ \& \ CLK \ \& \ NCA \ \& \ /BREADY$$
$$+ \ /MISS1 \ \& \ /CLK$$
$$+ \ /MISS1 \ \& \ BREADY$$

$$/PIPECYC385:= PIPECYC385 \ \& \ /BADS \ \& \ /BUSCYC385 \ \& \ CLK \ \& \ /BREADY \quad (5)$$
$$+ \ PIPECYC385 \ \& \ /MISS1 \ \& \ BT2 \ \& \ /BUSCYC385 \ \& \ CLK \ \& \ /BREADY$$
$$+ \ /PIPECYC385 \ \& \ /CLK$$

In the foregoing logic equations the following signals are described or referred to in the cited Intel publications:

BADS
BREADY
(BW/R) actually referred to as BW/R, the parenthesis are used to indicate that the entire term is one signal
CLK
(W/R) actually referred to as W/R, the parenthesis are used to indicate the entire term is one signal
BADS, when active indicates a valid address on the system bus 250. BREADY is a ready signal from the system bus 250 to the CPU local bus 230. BW/R defines a system bus 250 Write or Read. CLK is a processor clocking signal which is in phase with the processor 225. (W/R) is the conventional Write or Read signal for the CPU local bus 230.

Equations (1)–(5) define:
BT2
BUSCYC385
CPUNA
MISS1
PIPECYC385
in terms of the defined signals, the signals described or referred to in the cited Intel publications and NCA and NACACHE.

BT2 reflects the state of the system bus 250. The state BT2 is a state defined in the cited Intel publications.

BUSCYC385 also reflects the state of the system bus 250. It is high for bus states BTI, BT1 BT1P and low for bus states BT2, BT2P and BT2I (again these are bus states referenced in the cited Intel publications).

CPUNA is a signal to the 80386 allowing pipelined operation. This is the signal which replaces the NA signal from the 82385.

MISS1 is active defining the first cycle in a double cycle for handling 64 bit read to cacheable devices.

PIPECYC385 is active during BT1P (which is a bus state referred to in the cited Intel publications.

NCA is a signal created by decoding the address component on the CPU local bus 230 to reflect, when active, a non-cacheable access. Cacheability is determined by a tag component (A31 to A17) and programmable information defining what tags (if any) refer to cacheable as opposed to non-cacheable addresses.

NACACHE is a signal similar to the BNA signal. BNA is a system generated signal requesting a next address from the CPU local bus 230, and is referenced in the cited Intel publications. NACACHE differs from BNA only in respect of the fact that BNA is created for 32K cache while NACACHE is created for a 64K cache. So long as the cache memory is 32K, as cited in the Intel publications the NACACHE signal referred to here could be replaced by the BNA signal.

Reviewing Equation 3, the set terms are found in lines 1 and 2. The term on line 1 indicates a pipelined operation. /MISS1 indicates a 32-bit operation (as will be described) and so CPUNA is appropriate. The term on line 2 is a cycle that ends early without pipelining, e.g. /BREADY. Referring to Equation 4, the terms on lines 1 and 2 are the set terms. Both depend on NCA.

Figure 5:
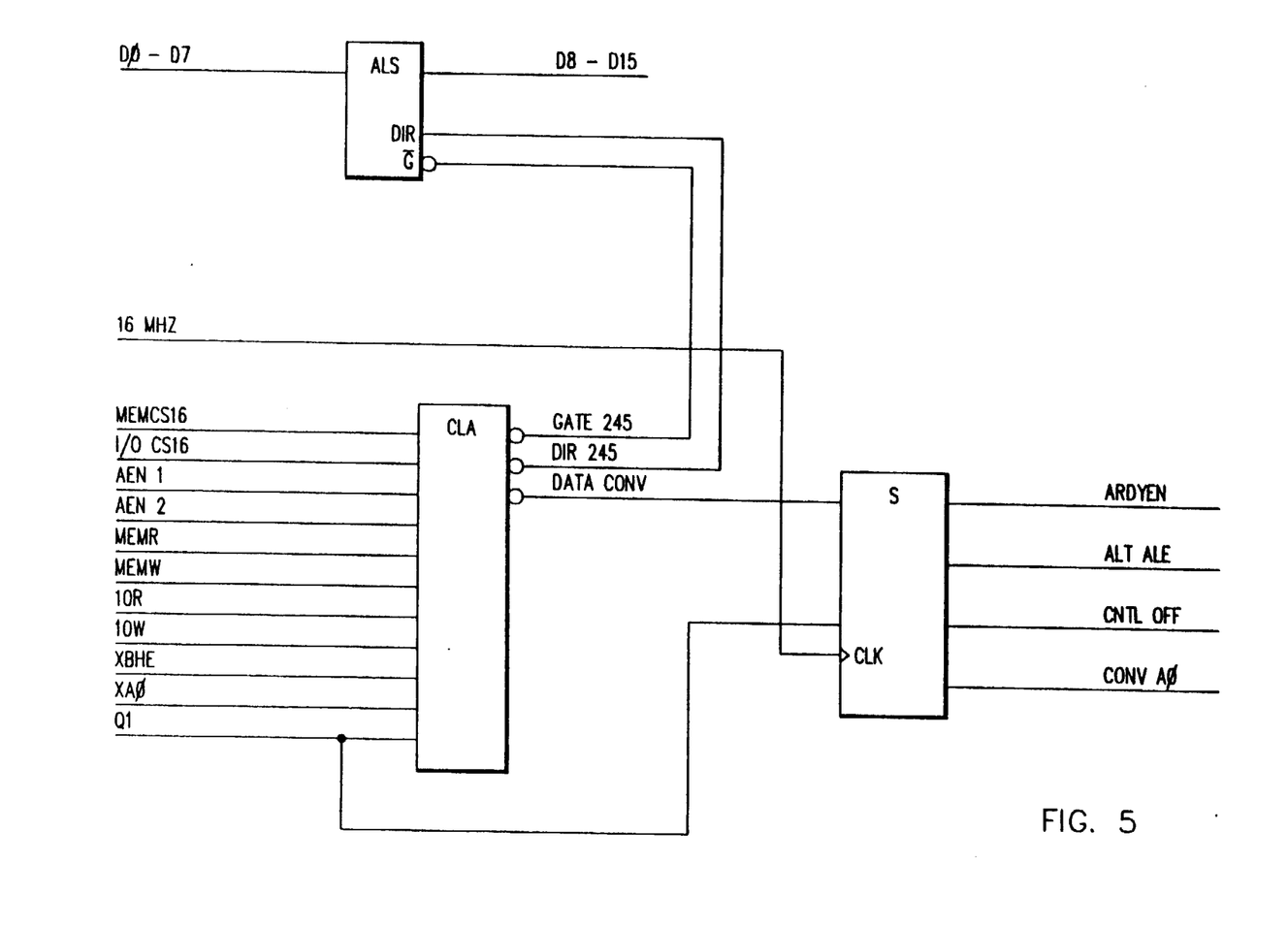
FIG. 5 is further detailed block diagram of apparatus which handles 16-to-8-bit cycle conversion transparent to both the 82385 and 80386.

FIG. 5 is a detail of apparatus associated with the buffer and decoder 267 (associated with bus 270) and buffer 253 (associated with a Micro-Channel (TM) bus 320). As has already been described, the apparatus of FIG. 4 provides for two 16-bit cycles when 32-bit cycles are directed to 8- or 16-bit devices, and does so in a manner transparent to the 82385. The apparatus of FIG. 5 is employed so as to generate, for each 16-bit cycle directed to an 8-bit device, two 8-bit cycles, in a manner which is transparent to the 80386.

More particularly, the apparatus includes control logic CLA, a sequencer S and a controlled coupler ALS which couples selective ones of the data lines to others of the data lines. More particularly, as shown in FIG. 5, the low order eight bits (D0-D7) can be coupled to the second 8-bit segment (D8-D15) under the control of the signal DIR and /G. Further, the direction of transfer (left to right or vice versa) is also controlled by DIR.

More particularly, in any 16-bit cycle generated by the 80386, data is placed on the low order sixteen bits of the data bus. In order to convert a 16-bit cycle generated by the 80386 into two 8-bit cycles for the appropriate MAD, the hardware shown in FIG. 5 forces the 16-bit operation to look like two 8-bit operations to the 8-bit device MAD while to the 80386 the two 8-bit cycles look like a single 16-bit cycle.

The control logic CLA performs a decode function for the conversion cycle control. It detects when a conversion cycle must occur and controls the GATE 245 and DIR 245 signals of the ALS which connect the low order eight bits of the data bus to a second 8-bit segment of the data bus. The logic equations for CLA are listed below. Once the conversion cycle conditions have been detected, the signal DATACONV activates the sequence. The signal CS16, when inactive, signals presence of an 8-bit device and hence the necessity for the conversion. The signal CS16, when active, indicates a 16- or 32-bit device. Q1 is used in the sequence to indicate the end of the first half of the conversion cycle. The signals DATACONV and Q1 are input to the sequencer S. The sequencer S performs two functions. One is to hold the 80386 not ready until the second half of the cycle has been initiated. ARDYEN is driven to a logic 1 to signal the 80386 not to end the cycle. The sequencer also stimulates the end of one 8-bit cycle and the beginning of a second. ALTALE clocks a logic 1 onto the A0 address line and causes the wait state generator to restart. CNTLOFF causes the active command signal to go inactive and active again to stimulate the end of one cycle and the beginning of another. CONVA0 is used as an input to the A0 address latch to force A0 to a logic 1 for the second half of the conversion cycle.

The completed 16- to 8-bit conversion cycle is equivalent in time and function to two consecutive 8-bit cycles.

The signals referred to above and shown in FIG. 5 are defined as follows:

| | |
|---|---|
| MEMCS16 (I/OCS16) | 16 bit memory device select. 16 bit I/O device select. Parenthesis are used to indicate the expression relates to a single signal |
| AEN1, AEN2 | Address enables from DMA controllers |
| MEMR, MEMW, IOR, IOW | CPU command signals |
| XBHE | Bus high enable, indicates when data should appear on a higher order eight bit segment of the data bus |
| XA0 | Least significant address order line |
| Q1 | Wait state generator output (2d state output) |
| D0-D7 | Lowest order eight bit segment of the data bus |
| D8-D15 | Second eight bit segment of the data bus |
| ARDYEN | Asynchronous ready enable to ready synchronization logic. ADDS wait states in conversion cycle to provide for the generation of two 8 bit cycles. |
| ALT ALE (active high) | Alternate address latch. User to clock A0 to a logic one and to restart the wait state generator for second 8 bit transfer |
| CONV.A0 (active high) | Conversion cycle A0. Provides a logic one to the A0 address latch so that A0 will increment for the second 8 bit cycle |
| CNTLOFF | Control off. Turns off the active command signal for 3 clocks to simulate the end of one 8 bit cycle and the start of the second 8 bit cycle. CNTLOFF is also used to latch the low order data bus to the CPU (during a read cycle) on the first 8 bit transfer. An input to the system bus interface unit. |

Logic Equations

/GATE 245:= MEMCS16 & AEN1 & AEN2 & /MEMR & /XBHE & XA0  (6)
 + MEMCS16 & AEN1 & AEN2 & /MEMW & /XBHE & XA0
 + (I/OCS16) & AEN1 & AEN2 & /IOR & /XBHE & XA0
 + (I/OCS16) & AEN1 & AEN2 & /IOW & /XBHE & XA0
 + /AEN1 & /MEMCS16 & /XBHE & /IOR
 + /AEN1 & /MEMCS16 & /XBHE & /MEMR

-continued

Logic Equations

/DIR245:= /AEN1 & /MEMR  (7)
+ AEN1 & AEN2 & /XBHE & /MEMW
+ AEN1 & AEN2 & /XBHE & /IOW

/DATA CONV:= MEMCS16 & AEN1 & AEN2 & /MEMR & Q1 & /XBHE & /XA0  (8)
+ MEMCS16 & AEN1 & AEN2 & /MEMW & Q1 & /XBHE & /XA0
+ (I/OCS16) & AEN1 & AEN2 & /IOR & Q1 & /XBHE & /XA0
+ (I/OCS16) & AEN1 & AEN2 & /IOW & Q1 & /XBHE & /XA0

Figure 6:
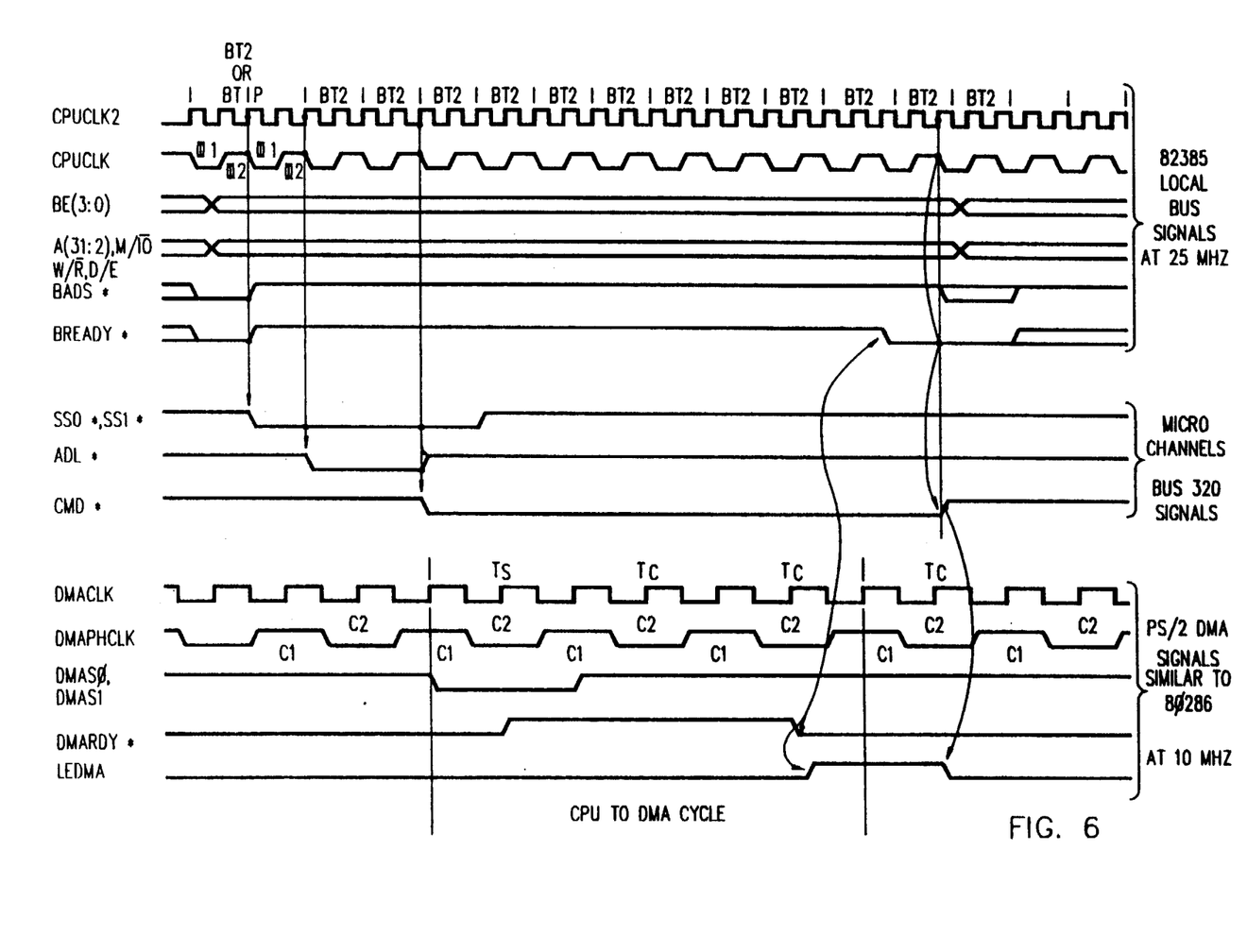
FIGS. 6 and 7 are a timing diagram and a block diagram of the latch DL and its control signal LEDMA (Latch Enable from DMA) to illustrate how the synchronous DMA subsystem is interfaced to the CPU local bus (operating under a different clock) to avoid possible contention on the system bus 250.
Figure 7:
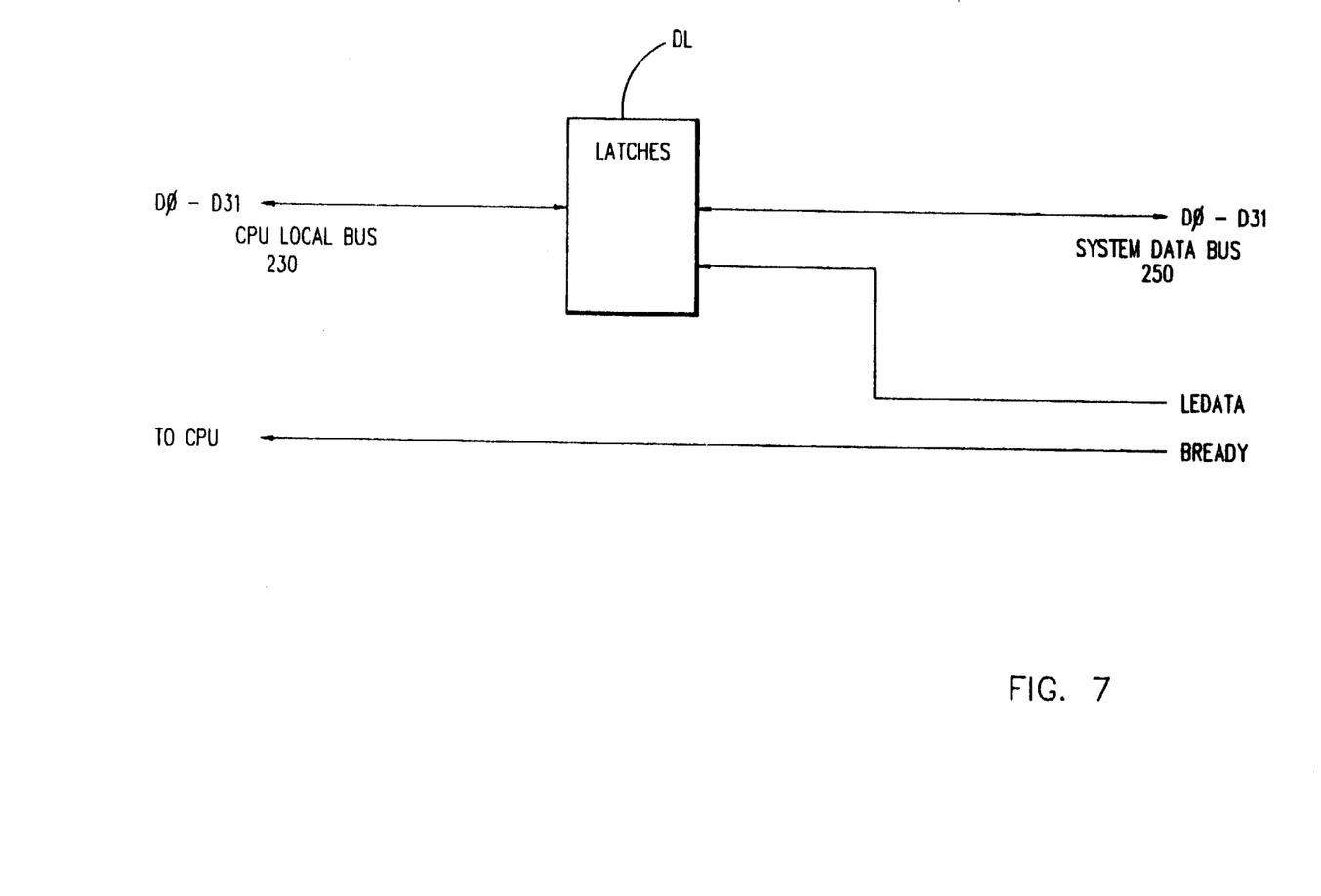

FIG. 7 shows a detail of the latch DL, the data input/output connections between the system bus 250 and the CPU local bus 230 as well as the control signal LEDMA. FIG. 6 relates the signal LEDMA to other signals on the CPU local bus 230 (indicated in the top third of FIG. 6 with the legend "82385 Local Bus Signals & 25 MHz"), signals on the optional feature bus 320 (indicated by the reference "Micro-Channel (TM)") bus 320 signals and signals on the system bus 250 (indicated in the bottom third by the legend "DMA Signals"). As indicated in the upper third of FIG. 6, the CPU local bus 230 is a synchronously clocked bus (clocks CPUCLK2 and CPUCLK are related as indicated). The central portion (comprising the major portion of FIG. 6) shows a single cycle on the CPU local bus 230. The beginning of the cycle is indicated by the left-most vertical line, and the end of the cycle is indicated by the right-most vertical line. As shown in FIG. 6 in the middle third, once a cycle has begun on the CPU local bus 230, for a cycle which extends through the system bus 250 to the bus 320, the command signals SS0* and SS1* become active (low). Shortly thereafter, an address is latched into the buffer 253 (referenced ADL*). Subsequently, the signal CMD* also becomes active (low). It is this point which defines the beginning of the DMA cycle on the system bus 250 and the optional feature bus 320. This is indicated by a continuation of the third vertical line (from the left) extending into the lower third of FIG. 6. Shortly after the beginning of the DMA cycle, the signals DMAS0 and DMAS1 become active (low). As seen in FIG. 6, the signal DMARDY* subsequently changes state. On the next transition in DMARDY* (the low going transition), the required data is located on the system bus 250. Accordingly, the signal LEDMA changes state (rising transition). This has the effect of latching the data on the system bus 250 into the latch DL. The same transition which produced the change of state in LEDMA also has an effect on BREADY* (as shown by the arrow in FIG. 6). In other words, once DMARDY* is sampled low, the required data has already latched into the latch DL and the DMA channel has released the bus 250. Thus as shown in FIG. 6, the transition in DMARDY* leads to a transition in BREADY*. On the next subsequent high going transition of BT2, the CPU cycle can safely end (and this is the right-most vertical line in FIG. 6). As seen in FIG. 6, ending the CPU cycle produces a change of state in CMD* (on the Micro-Channel (TM) bus 320) and also has the effect of releasing LEDMA, since at the termination of the cycle the CPU 225 accepted the data from the latch DL.

The foregoing illustrates that antecedent to terminating the CPU cycle, and a requirement for terminating the CPU cycle, is the prior termination of the DMA cycle. This guarantees that when the CPU initiates a following cycle (to the right of the right-most vertical line in FIG. 6), the DMA cycle had earlier completed and so the bus is free of any data that may have been driven during the course of the DMA cycle.

Thus the invention provides an accommodation between dynamic bus sizing (which provides the flexibility essential to the Micro-Channel (TM) bus 320) and pipelining operation through selected generation of CPUNA, at the appropriate time. As has been indicated, CPUNA depends either on detection of a cacheable access, where CPUNA is produced prior to completion of the pending cycle. On the other hand, where a non-cacheable access is detected, then pipelining is withheld, i.e. CPUNA is not asserted until the system bus 250 indicates that the cycle has completed (BREADY is asserted).

At the same time, an accommodation is created between the synchronous DMA mechanism and the synchronous (but driven by a different clock) CPU local bus through the buffer DL. While the DMA cycle is initiated by the CPU local bus 230, the cycle on the CPU local bus 230 will not terminate until after the termination of the DMA cycle.

While a particular embodiment of the invention has been described herein, it should be apparent that the invention can be embodied in many varied forms. Accordingly, the invention is not to be construed by the example described herein but rather is to be construed in accordance with the attached claims.

We claim:

1. A microcomputer system comprising:
   a processor of a given bit width for executing instructions,
   first means including the processor for generating an address of a next instruction and initiating fetching of said next instruction during the execution of at least some currently executing instructions, whereby instructions may be prefetched for pipelined instruction execution,
   additional means including the processor for generating a next instruction address and initiating fetching of a next instruction upon completing execution of a currently executing instruction for non-pipelined instruction execution,
   a cache memory subsystem of said given bit width, having an address range for cacheable data, and coupled to said processor by a local bus,
   a further bus connecting said local bus with addressable other components having said given bit width and with at least one addressable component of a reduced bit width for transferring data between said components and said processor and subsystem via said further bus and local bus during execution of certain of said instructions, at least some of said components having said given bit width having an address in said address range of said cache subsystem and at least one component of reduced bit width having an address outside said address range;
   said processor further including means responsive to the execution of each of said certain instructions for asserting on said local bus a component address alternatively within or outside of said address range, address decoder means responsive to each said asserted address on said local bus during the execution of said certain instructions for generating a signal indicating whether said asserted address is alternatively within or outside of said address range, and logic means responsive to the signal generated by said address decoder for rendering said first means effective to generate a next instruction address for pipelined operation when said address decoder means indicates an asserted address within said address range and for rendering said additional means effective to generate a next instruction address for non-pipelined operation when said address decoder means indicates an asserted address outside said address range.

2. A system as recited in claim 1 further comprising:
a first interface coupled between said local bus and said further bus, and wherein said further bus comprises:
a system bus directly connected to said interface, at least some of said other components connected to said system bus;
a second interface directly connected between said system bus and an optional feature bus, where at least some of said other components are coupled to said optional feature bus for transferring data between said last mentioned components and said processor and subsystem via said first and second interfaces, said system bus and said optional feature bus.

3. A system as recited in claim 2 wherein said one component of a reduced bit width is directly connected to said optional feature bus for transferring data with said processor and subsystem via said first and second interface, said system bus and said optional feature bus.

4. A system as recited in claim 1 further comprising:
DMA control means coupled directly to said further bus and including
means effective during the execution of said certain instructions by the processor to initiate DMA cycles for controlling communication and data transfer between the processor and said other components via said local bus and said further bus, and
means effective at the end of each DMA cycle for notifying the additional means that the execution of a currently executing instruction is completed whereby the processor can initiate fetching of a next instruction.

5. A microprocessor system comprising:
a CPU, a cache subsystem having an address range for cacheable data and a local bus interconnecting said CPU and subsystem,
a system bus connected to the local bus by a buffer means for coupling functional units to said CPU and cache subsystem,
said CPU, cache subsystem, local bus, system bus and certain of said functional units having equal bit widths and others of said functional units having a smaller bit width,
at least some of said certain functional units, but none of said other functional units, having addresses within the address range of the cache subsystem,
said CPU including means for initiating a next cycle of operation, an address decoder responsive to functional unit addresses generated by the CPU on the local bus during cycles of operation to determine whether or not they fall within the address range of the cache subsystem, and logic means responsive to the address decoder for controlling operation of the CPU means by allowing it to proceed to a next cycle of operation prior to completion of a current cycle of operation when the decoded address is within said address range or alternatively stopping it from proceeding to the next cycle of operation until completion of the current cycle of operation when the decoded address is outside said address range.

6. A microprocessor system comprising:
a CPU, a cache subsystem having an address range for cacheable data and a local bus interconnecting said CPU and subsystem, said CPU, cache subsystem and local bus having equal bit widths,
a system bus coupled to the local bus by a buffer and an optional feature bus coupled to the system bus by an interface for coupling respective functional units to the CPU and cache subsystem,
said system bus, optional feature bus and certain of said functional units having a bit width equal to that of said CPU, cache subsystem and local bus and others of said functional units having a smaller bit width;
at least some of said certain functional units, but none of said other functional units, having addresses within the address range of the cache subsystem,
said CPU including means for initiating a next cycle of operation,
an address decoder responsive to functional unit addresses generated by the CPU on the local bus during each cycle of operation to determine whether or not they fall within the address range of the cache subsystem, and
logic means responsive to the address decoder for controlling operation of the CPU means by allowing it to proceed to a next cycle of operation prior to completion of a current cycle of operation when the decoded address is within said address range or alliteratively stopping it from proceeding to the next cycle of operation until completion of the current cycle of operation when the decoded address is outside said address range.

7. A microprocessor system comprising:
a CPU, a cache subsystem and a local bus interconnecting the CUP and cache subsystem, said CPU, cache subsystem and local bus having equal data bus widths,
said CPU including means for executing data transfer instructions directed to functional units and for generating a functional unit address on the local bus during the execution of each of said instructions;
a system bus coupled to said local bus for routing data transfers to and from the CPU during execution of said data transfer instructions;
said cache subsystem having a range of addresses including addresses assignable to functional unit having said equal data bus width;
addresses outside of said range of addresses including addresses assignable to other functional units of said equal data bus width and of smaller data bus widths;

said CPU including means for initiating a next instruction cycle;
an address decoder responsive to a functional unit address generated by the CPU on the local bus during the execution of each of said data transfer instructions to determine whether or not it falls within the address range of the cache subsystem; and
logic means responsive to the address decoder for controlling operation of the CPU means by allowing it to proceed to a next instruction cycle prior to completion of a current instruction cycle when the decoded address is within said address range or alliteratively stopping it from proceeding to the next instruction cycle until completion of the current instruction cycle when the decoded address is outside said address range.

8. A microcomputer system comprising: a processor of a given bit width for executing instructions including data transfer instructions directed to functional units,
first means including the processor for generating an address of a next instruction and initiating fetching of said next instruction during the execution of at least some currently executing instructions, whereby instructions may be prefeteched for pipelined instruction execution,
additional means including the processor for generating a next instruction address and initiating fetching of a next instruction upon completing execution of a currently executing instruction for non-pipelined instruction execution,
a cache memory subsystem of said given bit width, having an address range for cacheable data, and coupled to said processor by a local bus,
a system bus for routing data transfers to and from the processor via said system bus and local bus during execution of said data transfer instructions,
addressees within said address range including addresses assignable to functional units having said given bit width,
addresses outside of said address range including addresses assignable to other functional units having said given bit width and to functional units having a smaller bit width than said given bit width,
said processor further including means responsive to the execution of each of said data transfer instructions for asserting on said local bus a functional unit address alternatively within or outside of said address range,
address decoder means responsive to each said asserted address on said local bus during the execution of said data transfer instructions for generating a signal indicating whether said asserted address is alternatively within or outside of said address range, and
logic means responsive to the signal generated by said address decoder for rendering said first means effective to generate a next instruction address for pipelined operation when said address decoder means indicates an asserted address within said address range and for rendering said additional means effective to generate a next instruction address for non-pipelined operation when said address decoder means indicates an asserted address outside said address range.

9. A microprocessor system comprising:
a CPU for executing certain instructions including data transfers directed to functional units and for generating functional unit address information on a local bus during the execution of said instructions;
a cache subsystem and a local bus interconnecting said CUP and subsystem;
a system bus and a buffer coupling the system bus to the local bus for routing said data transfers between the CPU and said functional units, said CPU, local bus and system bus having equal bit widths;
an address decoder responsive to said address information placed on the local bus by the CPU to determine whether or not the address falls within an address range of the cache subsystem;
logic means responsive to the address decoder during each data transfer for controlling operation of the CPU by allowing it to proceed to a next CPU instruction prior to completion of the data transfer when the decoded address is within said address range, and alliteratively stopping the CPU from proceeding to the next CPU instruction until completion of the data transfer when the decoded address is outside said address range;
addresses within said address range including addresses assignable to functional units having said equal data bus width; and
addresses outside said address range including addresses assignable to other functional units having said equal data bus width and functional units having a data bus width smaller than said equal data bus width.

* * * * *

UNITED STATES PATENT AND TRADEMARK OFFICE
CERTIFICATE OF CORRECTION

PATENT NO. : 5,125,084
DATED : June 23, 1992
INVENTOR(S) : R.M. Begun, et al

It is certified that error appears in the above-indentified patent and that said Letters Patent is hereby corrected as shown below:

Column 8, line 21, which reads  + /CPUNA  &  /CLK
the following:

--+ /CPUNA & MISSI & CLK --

Signed and Sealed this

Twenty-second Day of March, 1994

Attest:

BRUCE LEHMAN

Attesting Officer        Commissioner of Patents and Trademarks